United States Patent [19]

Crinon et al.

[11] Patent Number: 4,800,443
[45] Date of Patent: Jan. 24, 1989

[54] METHOD AND APPARATUS FOR CARRYING OUT A DITHERING OPERATION

[75] Inventors: Regis J. Crinon, Beaverton; Yih-Chyun Jenq, Lake Oswego, both of Oreg.

[73] Assignee: Tektronix, Inc., Beaverton, Oreg.

[21] Appl. No.: 85,425

[22] Filed: Aug. 14, 1987

[51] Int. Cl.⁴ ............................................. H04N 1/40
[52] U.S. Cl. .................................. 338/280; 358/241; 358/282; 358/283; 358/298
[58] Field of Search ............... 358/280, 282, 283, 241, 358/298

[56] References Cited

U.S. PATENT DOCUMENTS 4,710,822 12/1987 Matsunawa .................... 358/282
4,741,046 4/1988 Matsunawa .................... 358/283

*Primary Examiner*—Howard W. Britton
*Attorney, Agent, or Firm*—John Smith-Hill; Robert S. Hulse

[57] ABSTRACT

A two-dimensional array of binary values is used to control operation of a bi-level imaging device. The array of binary values is formed by applying an enhanced array $g(u,v)$ to a two-dimensional array of threshold values. A two-dimensional array of pixel value $f(u,v)$ is used to form the enhanced array $g(u,v)$ such that $g(u,v) = m_f + k[f(u,v) - m_f]$ where $m_f$ is the average value of $f(u+a, v+b)$ from $a = -L$ to $a = +L$ and $b = -M$ to $b = +M$ and k is a gain function which depends on the standard deviation in $f(u+c, v+d)$ from $c = -N$ to $c = +N$ and $d = -P$ to $d = +P$. L, M, N and P define the sub-array over which the standard deviation is calculated. Preferably, L, M, N and P are each equal to 2. The value of k is a decreasing function of the standard deviation: the larger the standard deviation, the smaller the gain factor k. The rate at which k decreases with increase in the standard deviation depends on the edge sampling characteristics of the array of threshold values.

8 Claims, 2 Drawing Sheets

| 0 | 128 | 32 | 160 | 8 | 136 | 40 | 168 | 2 | 130 | 34 | 162 | 10 | 138 | 42 | 170 |
|---|---|---|---|---|---|---|---|---|---|---|---|---|---|---|---|
| 192 | 64 | 224 | 96 | 200 | 72 | 232 | 104 | 194 | 66 | 226 | 98 | 202 | 74 | 234 | 106 |
| 48 | 176 | 16 | 144 | 56 | 184 | 24 | 152 | 50 | 178 | 18 | 146 | 58 | 186 | 26 | 154 |
| 240 | 112 | 208 | 80 | 248 | 120 | 216 | 88 | 242 | 114 | 210 | 82 | 250 | 122 | 218 | 90 |
| 12 | 140 | 44 | 172 | 4 | 132 | 36 | 164 | 14 | 142 | 46 | 174 | 6 | 134 | 38 | 166 |
| 204 | 76 | 236 | 108 | 196 | 68 | 228 | 100 | 206 | 78 | 238 | 110 | 198 | 70 | 230 | 102 |
| 60 | 188 | 28 | 156 | 52 | 180 | 20 | 148 | 62 | 190 | 30 | 158 | 54 | 182 | 22 | 150 |
| 252 | 124 | 220 | 92 | 244 | 116 | 212 | 84 | 254 | 126 | 222 | 94 | 246 | 118 | 214 | 86 |
| 3 | 131 | 35 | 163 | 11 | 139 | 43 | 171 | 1 | 129 | 33 | 161 | 9 | 137 | 41 | 169 |
| 195 | 67 | 227 | 99 | 203 | 75 | 235 | 107 | 193 | 65 | 225 | 97 | 201 | 73 | 233 | 105 |
| 51 | 179 | 19 | 147 | 59 | 187 | 27 | 155 | 49 | 177 | 17 | 145 | 57 | 185 | 25 | 153 |
| 243 | 115 | 211 | 83 | 251 | 123 | 219 | 91 | 241 | 113 | 209 | 81 | 249 | 121 | 217 | 89 |
| 15 | 143 | 47 | 175 | 7 | 135 | 39 | 167 | 13 | 141 | 45 | 173 | 5 | 133 | 37 | 165 |
| 207 | 79 | 239 | 111 | 199 | 71 | 231 | 103 | 205 | 77 | 237 | 109 | 197 | 69 | 229 | 101 |
| 63 | 191 | 31 | 159 | 55 | 183 | 23 | 151 | 61 | 189 | 29 | 157 | 53 | 181 | 21 | 149 |
| 255 | 127 | 223 | 95 | 247 | 119 | 215 | 87 | 253 | 125 | 221 | 93 | 245 | 117 | 213 | 85 |

METHOD AND APPARATUS FOR CARRYING OUT A DITHERING OPERATION

BACKGROUND OF THE INVENTION

This invention relates to a method and apparatus for carrying out a dithering operation.

Several types of imaging devices, i.e. devices for creating a visible image in response to an electrical signal, simulate a spatially continuous image as a rectangular array of discrete pixels. One such imaging device is the cathode ray tube display device. In the case of a cathode ray tube display device, the intensity with which a given pixel is illuminated is continuously variable and therefore a continuous tone image can be rendered. The ink-jet printer on the other hand, is a bi-level imaging device, in that each pixel is either stimulated, by printing a dot, or is not stimulated, so that no ink is applied and the paper is left white at that pixel position. The liquid crystal display device is a bi-level imaging device in which each pixel either reflects or absorbs incident light.

Ordered dithering is used to enable a continuous tone image to be rendered by use of a bilevel imaging device. In a conventional ordered dithering operation, a continuous tone image is sampled uniformly in two mutually perpendicular directions to provide a rectangular array of pixel values. A rectangular half-tone screen provides a threshold value for each pixel, and each pixel value is compared with the corresponding threshold value. If the pixel value is greater than the threshold value, a dot is printed for that pixel, and otherwise the paper is left white.

The half-tone screen may be organized as a magic square, which is a square array of numbers such that each column, each row and the two major diagonals produce the same sum. The screen is repeated over the array of pixel values without overlapping, so that one threshold value is associated with each pixel value. A 16×16 magic square is shown in FIG. 1. If the image is composed of an array of 1024×1024 pixels, the 16×16 magic square is repeated 4096 times over the image.

The magic square shown in FIG. 1 is a rectangular array of numbers from 0 to 255. It will be understood by those skilled in the art that such a magic square would be used for carrying out a dithering operation on a sequence of pixel values that can be expressed by numbers in the range from 0 to 255, e.g. an eight-bit digital signal. If a given pixel value is mapped to a cell of the magic square for which the number is less than the pixel value, a dot is applied to the paper, otherwise no dot is applied to the paper.

The conventional ordered dithering operation is subject to disadvantage, in that it is not well-suited to the rendering of edges of relatively low contrast. Whether an edge is detected by a half-tone screen depends on the amplitude, or contrast, of the edge and on the orientation of the edge relative to the screen. For example, FIG. 1 illustrates lines connecting the numbers 0, 1, 2, 3 (increments of 1); 0, 4, 8, 12 (increments of 4); 7, 23, 39, 55 (16); and 13, 77, 141, 205 (64). The significance of these groups of numbers is that the distance between the numbers indicates the frequency with which the contrast value represented by the increment is sampled. Assuming that the horizontal and vertical spacings between adjacent numbers are equal to one, the distance between the numbers 0 and 4 is equal to 8.94 whereas the distance between the numbers 4 and 8 is equal to 8. The distance between the numbers 7 and 23 is 2.24 and the distance between 23 and 39 is 2. Thus, the contrast value of 4 is sampled at a frequency $(1/8.94)f_s$, where $f_s$ is the spatial frequency at which the image is sampled, or $(\frac{1}{8})f_s$, depending on the sampling direction, and the contrast value 16 is sampled at a frequency $(1/2.24)f_s$ or $(\frac{1}{2})f_s$, depending on the sampling direction.

Attempts have been made to overcome this disadvantage of the ordered dithering operation by designing adaptive ordered dithering schemes. Attention is directed in this regard to D. Anastassiou and K. Pennington "Digital Half-Toning of Images", IBM Journal of Research and Development, Vol. 26, No. 6, November 1982, 687; P. Roetling "Half-Tone Method with Edge Enhancement and Moire Suppression", Journal of the Optical Society of America, Vol. 66, No. 10, October 1976, 985; J. White "Systems Approach for Bilevel Printer/Display Thresholding with Resolution Translation", SID 80 Digest, 94, and S. Yoshida, M. Itoh, N. Umebara and H. Sakamoto "High Resolution Thermal Ink Transfer Color Printer", SID 85 Digest, 140. These adaptive schemes are themselves subject to disadvantage, however, in that they are computationally intensive or are not suitable for use with color pictures. Moreover, the adaptive schemes do not use the properties of the half-tone screen in the frequency domain. Such properties have long been established to have a significant influence on image quality.

SUMMARY OF THE INVENTION

In a preferred embodiment of the present invention, a two-dimensional array of pixel values $f(u,v)$ is used to form an enhanced array of pixel values $g(u,v)$ such that $g(u,v) = m_f + k[f(u,v) - m_f]$ where $m_f$ is the average value of $f(u+a, v+b)$ from $a = -L$ to $a = +L$ and $b = -M$ to $b = +M$ and k is a gain function which depends on the standard deviation in $f(u+c, v+d)$ from $c = -N$ to $c = +N$ and $d = -P$ to $d = +P$. The value of k is a decreasing function of the standard deviation: the larger the standard deviation, the smaller the gain factor k. A two-dimensional array of binary values is formed by applying the enhanced array to a two-dimensional array of threshold values. The binary values may then be used to control operation of a bi-level imaging device. The rate at which k decreases with increase in the standard deviation depends on the edge sampling characteristics of the array of the threshold values.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

An analog monochrome video signal representative of a continuous tone image is converted to digital form by an eight-bit digital-to-analog converter (DAC) 10 under control of a sampling clock provided by a sampling clock generator 12. The frequency of the sampling clock is such that 1024 digital words, each representing the luminance of a single pixel, are generated during the active interval of each line of the video signal. During the blanking intervals of the video signal, the sampling clock is not applied to the DAC 10. The digital words provided by the DAC 10 are applied to a six-line buffer 14. The buffer 14 is organized as six rows 14A ... 14F, each containing 1024 memory locations. Control logic 16, which receives the sampling clock signal, applies read/write enable signals to the buffer 14, such that during each active line interval one row of the buffer is in the write state and the other five rows are in the read state. The control logic also provides a ten-bit address signal to the buffer. During each active line interval, the words representing the pixel values for that line are written into one of the rows of the buffer under control of the address signal provided by the control logic 16. When the line (v+3) of the video signal has been written into a given row of the buffer 14, that row is switched to the read state and the row containing the line (v−2) is switched to the write state for receiving line (v+4).

For each input word that is written into the buffer 14, an output word is generated from the contents of the rows that are in the read state. Thus, as line (v+3) of a frame of the video signal is being written into the buffer 14, the contents of the other five rows, containing lines (v+2)...(v−2), are used to create line v of the output video signal. In particular, when the uth data word f(u,v+3) of line (v+3) is written into the buffer, the data words at locations u−2 through u+2 of each of the other five rows of the buffer are read and are applied to a processor 22 to generate an output data word g(u,v) to represent pixel u of line v. The manner in which the 25 data words are used is explained below. Of course, if u is less than 2 or greater than 1022, fewer words are used to create the output data word.

Figures 1, 2:
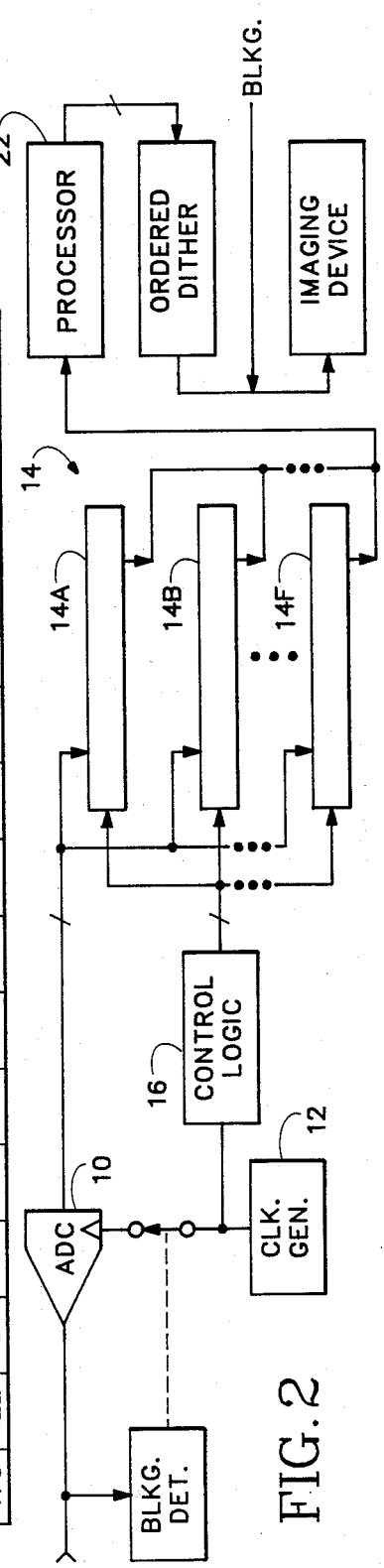
FIG. 1 illustrates a 16×16 magic square half-tone screen.
FIG. 2 is a block diagram of apparatus for generating a two-dimensional array of binary values from a monochrome video signal.

A conventional ordered dithering operation is performed on the data words g, for example using the 16×16 magic square half-tone screen shown in FIG. 1, to provide a sequence of binary values h(u,v). It will be understood that the ordered dithering operation may be performed by the processor 22, through use of appropriate programs, even through the operation is illustrated in FIG. 2 as a separate block. The succession of binary values h(u,v), with blanking reinserted, is used to control a bi-level imaging device 24.

It can be shown that if $$g(u,v) = m_f + k[f(u,v) - m_f]$$

where $m_f$ is the mean value of $f(u,v)$ over a neighborhood centered on (u,v) and k is a function of the standard deviation in $f(u,f)$ over a neighborhood centered on (u,v), the standard deviation in $g(u,v)$ is equal to k times the standard deviation in $f(u,v)$. This implies that by appropriate selection of the value of k, low contrast edges represented in the array $f(u,v)$ will rendered in the array $g(u,v)$ with greater contrast, and therefore will be more likely to be detected by the half-tone screen.

The mean value $m_f$ is given by $$m_f = [1/(2L+1)^{**}2] \text{Sum}(a=-L,+L-)\text{Sum}(b=-L,+L)f(u+a,v+b)$$

where Sum represents a summation over the range indicated in parenthesis. The value of $m_f$ can thus be calculated relatively easily. The values of L and M must be sufficiently large to provide a robust estimate for $m_f$ which will not be corrupted by noise, yet must be small enough to allow $m_f$ to track the nonstationary local mean brightness of the image. In the case of the apparatus shown in FIG. 2, the values of L and M are chosen to be 2: hence the need to provide the data words f(u−2, ... u+2, v−2, ... v+2) to the processor 22.

Theoretically, the standard deviation in f(u,v) should be calculated over a neighborhood from u−N to u+N and from v−P to v+P, with the values of N and P being selected on a similar basis to the values of L and M. However, calculation of standard deviations is time consuming, and therefore the absolute moment abs.(f(u,v)−$m_f$) is used as an approximation to the standard deviation.

Figures 3, 4:
FIG. 3 illustrates a 16×16 half-tone screen which is not a magic square.
FIG. 4 is a graph illustrating the operation of the invention.

The gain function k is a decreasing function of the standard deviation (or its approximation, the absolute moment). The rate at which the function k decreases depends on the edge sampling characteristics of the half-tone screen used in the ordered dithering operation. The function k must be a decreasing function of the standard deviation because it will always be necessary to enhance small edges more than large ones. Moreover, it is desirable to prevent overflows beyond the original data range ([0,255] in this case) from occurring due to over-amplification of large edges, since such overflows affect the mean luminance perceived by the viewer. If it is assumed that the half-tone screen is the 16×16 screen shown in FIG. 3, which is not a magic square, it can be shown that the rates $F_{Ci}$ at which the edge amplitude $C_i$ is sampled, where $C_i = 2^i$, for i=0, 2, 4, 6 are as shown in column A of the following table.

TABLE

| | A | B |
| --- | --- | --- |
| C0 | 0.088 fs | 0.112 fs |
| C2 | 0.178 fs | 0.112 fs |
| C4 | 0.353 fs | 0.447 fs |
| C6 | 0.707 fs | 0.447 fs |

On the other hand, for the magic square shown in FIG. 1, the rates $F_{Ci}$ are as shown in column B of the table. For the half-tone screen shown in FIG. 3, it is possible to distinguish five sets of edge amplitude values, which may be designated $R_i$ (i=0, 1, 2, 3, 4), for the absolute moment abs.(f(u,v)−$m_f$) in the range from 0 to 2, from 2 to 8, from 8 to 32, from 32 to 128 and from 128 to 256.

Only three sets of edge contrast values ([0,8], [8,128] and [128,255]) can be distinguished for the screen shown in FIG. 1. Nevertheless, to facilitate comparison between the two screens we may designate five sets $R_i$ for the screen shown in FIG. 1.

The function k may conveniently be approximated by a piecewise constant function, the value of which over the domain $R_i$ may be designated $k_{Ri}$. Since small contrast values are sampled at the lowest rate, in order to improve detail rendition it is necessary that $k_{R4} <= k_{R3} <= k_{R2} <= k_{R1} <= k_{R0}$. Column B of the table implies that $k_{R0} = k_{R1}$ and $k_{R2} = k_{R3}$ for the FIG. 1 screen. The value $k_{R4}$ is applied to absolute moments of at least 128; $k_{R4}$ is therefore set to one since an edge amplitude of 128 will be detected without amplification. Moreover, enhancement of the largest edges must be controlled to avoid overflows. It has been found that, for the FIG. 1 screen, $k_{R0} = k_{R1} = 4$, $k_{R2} = 3$, $k_{R3} = 3/2$, $k_{R4}=1$ provides good results with an ink-jet printer. This function is plotted in FIG. 4.

Theoretically, $k_{R3}$ should be equal to $k_{R2}$ for the FIG. 1 screen, but $k_{R3}$ was made smaller than $k_{R2}$ in order to reduce the probability that overflows would occur. It will be seen from FIG. 4 that if the values of $m_f$ for two adjacent pixels f(u,v) and f(u+1, v) are the same but the difference between f(u,v) and f(u+1, v) is less than 8, the difference between the values of g(u,v) and g(u+1, v) is four times the difference between f(u,v) and f(u+1, v). If the difference between f(u,v) and f(u+1, v) is greater than 128, the difference between g(u,v) and g(u+1, v) is the same as the difference between f(u,v) and f(u+1, v). Small contrasts between adjacent pixels are therefore increased, while high contrast values are unchanged.

A source code listing written in "C" for the program executed by the processor 22 is contained in Appendix A. A glossary of functions used in the source code listing is contained in Appendix B.

The above-described technique may be applied to the processing of color images. For example, an image may be represented by color component video signals R, G and B. In natural scene imagery, there is usually a high degree of correlation between R, G, and B. If the R, G, and B component signals are treated separately, the correlation between the red, green and blue separation images will be destroyed. In order to preserve the correlation between the red, green and blue separation images, the R, G and B component signals are converted to Y, I and Q component signals, and only the luminance component Y is subjected to the enhancement operation.

It will be appreciated that the present invention is not restricted to the particular embodiment that has been described and illustrated, and that variations may be made therein without departing from the scope of the invention as defined in the appended claims and equivalents thereof.

METHOD AND APPARATUS FOR CARRYING OUT A DITHERING OPERATION

APPENDIX A

Copyright Tektronix, Inc.

All rights reserved source_listing.c

```
/*********************************************/
/*                                           */
/* THE DYNAMIC ORDERED DITHERING ALGORITHM   */
/*                                           */
/*********************************************/

/**
The continuous picture is assumed to be in the file IN_IMAGE (1024x1024 pixels)
The dynamic ordered dithered picture will be stored into the file OUT_IMAGE
**/ include <stdio.h>

/ define pointer to threshold value within the magic square /
/** The operator % is the MODULO operator **/
#define P_MATRIX (((x%16)*16)+(y%16))

/** define data type as unsigned char (8 bits samples) **/
typedef unsigned char U_C;
```

```
/** initialize magic square half-tone screen **/
double magic_square[256] = {
17.,193.,33.,241.,28.,204.,44.,252.,18.,194.,34.,242.,31.,207.,47.,255.,
97.,177.,81.,129.,108.,188.,92.,140.,98.,178.,82.,130.,111.,191.,95.,143.,
209.,1.,225.,49.,220.,12.,236.,60.,210.,2.,226.,50.,223.,15.,239.,63.,
161.,113.,145.,65.,172.,124.,156.,76.,162.,114.,146.,66.,175.,127.,159.,79.,
22.,198.,38.,246.,27.,203.,43.,251.,21.,197.,37.,245.,24.,200.,40.,248.,
102.,182.,86.,134.,107.,187.,91.,139.,101.,181.,85.,133.,104.,184.,88.,136.,
214.,6.,230.,54.,219.,11.,235.,59.,213.,5.,229.,53.,216.,8.,232.,56.,
166.,118.,150.,70.,171.,123.,155.,75.,165.,117.,149.,69.,168.,120.,152.,72.,
29.,205.,45.,253.,16.,192.,32.,240.,30.,206.,46.,254.,19.,195.,35.,243.,
109.,189.,93.,141.,96.,176.,80.,128.,110.,190.,94.,142.,99.,179.,83.,131.,
221.,13.,237.,61.,208.,0.,224.,48.,222.,14.,238.,62.,211.,3.,227.,51.,
173.,125.,157.,77.,160.,112.,144.,64.,174.,126.,158.,78.,163.,115.,147.,67.,
26.,202.,42.,250.,23.,199.,39.,247.,25.,201.,41.,249.,20.,196.,36.,244.,
106.,186.,90.,138.,103.,183.,87.,135.,105.,185.,89.,137.,100.,180.,84.,132.,
218.,10.,234.,58.,215.,7.,231.,55.,217.,9.,233.,57.,212.,4.,228.,52.,
170.,122.,154.,74.,167.,119.,151.,71.,169.,121.,153.,73.,164.,116.,148.,68.
};

main(){

FILE *fopen(), *fp_in, *fp_out;
        U_C **z, *zz, *z_plus1, *z_minus1, *z_plus2, *z_minus2;
        U_C *out;
        int x, y, yy, yyy, xdim, ydim;
        double res, mean;
        double fabs(), dif, k0, k1, k2, k3;

/** Initialize gain values **/
        k0 = k1 = 4.0;
        k2 = 3;
        k3 = 1.5;
        /** Picture is assumed to be a 1024x1024 rectangular grid **/
        xdim = ydim = 1024;

/** define pointer to the input and output picture files **/
        fp_in = fopen("IN_IMAGE", "r");
``` source_listing.c                                                                2

```
        fp_out = fopen("OUT_IMAGE", "w");

/** Allocate memory to store picture row addresses **/
        z = (U_C **) malloc( (unsigned) (xdim * sizeof(int)) );
        /** Allocate memory for dynamic ordered dithered picture row **/
        out = (U_C *) malloc( (unsigned) ydim );

/** read the 1024 picture rows in **/
        for(x = 0; x < xdim; x++) fread(z[x], sizeof(char), ydim, fp_in);

/** compute the average luminance in every single picture row **/
        for(x = 0; x < xdim; x++)
                {
                / make sure that we do not go beyond the picture /
                / boundaries; if so, provide the missing pixels  /
                / by duplicating those along the picture boundary / zz = z[x];
                z_plus2  = x+2 >= xdim ? z[xdim-1] : z[x+2];
                z_plus1  = x+1 >= xdim ? z[xdim-1] : z[x+1];
                z_minus2 = x-2 < 0 ? z[0] : z[x-2];
                z_minus1 = x-1 < 0 ? z[0] : z[x-1];

/** compute the average luminance at every pixel **/
                for(y = 0; y < ydim; y++)
```

```
{
/** start computing averaged luminance at pixel (x,y)**/
    mean = 0.0;
    for(yy=y-2; yy<=y+2; yy++)
            {

/ make sure that we do not go beyond the picture /
/ boundaries; if so, provide the missing pixels  /
/ by duplicating those along the picture boundary / if( yy < 0 ) yyy=0;
            else if( yy >= ydim ) yyy=ydim-1;
            else yyy=yy;

mean += (double) z_minus2[yyy]
                  + (double) z_minus1[yyy]
                  + (double) zz[yyy]
                  + (double) z_plus1[yyy]
                  + (double) z_plus2[yyy];
            }
/** there are 25 pixel values within a 5x5 kernel **/
/** divide mean by 25 to get average luminance **/
    mean /= 25.0;

/** Estimate standard deviation by computing **/
/ the absolute moment                       / dif = fabs( (double)zz[y] - mean );

/ Select proper gain value /
        if( dif < 2.0 )
        res = mean + (k0 * ((double)zz[y] - mean));
        else if( dif < 8.0 )
        res = mean + (k1 * ((double)zz[y] - mean));
        else if( dif < 32.0 )
        res = mean + (k2 * ((double)zz[y] - mean));
        else if( dif < 128.0 )
``` source_listing.c                                              3

```
        res = mean + (k3 * ((double) zz[y] - mean));
        else
        res = zz[y];

/** Use standard ordered dithering operation **/
/** Compare pixel value with threshold value **/
/** Print a white dot if res > threshold     **/
/** Print a black dot otherwise              **/
/** 255 corresponds to a white dot           **/
/** 0 corresponds to a black dot             **/
        out[y] = res > magic_square[P_MATRIX] ? 255 : 0;

}
/** Write half-toned picture row out **/
    fwrite(out, sizeof(char), ydim, fp_out);
    }
```

METHOD AND APPARATUS FOR
CARRYING OUT A DITHERING OPERATION

APPENDIX B

Copyright Tektronix, Inc.

All rights reserved

```
/*******************************************************************/

GLOSSARY OF FUNCTION USED IN THE SOURCE LISTING
         ------------------------------------------------

/*******************************************************************/

NAME
     fopen

SYNOPSIS
     #include <stdio.h>

FILE *fopen(filename, type)
     char *filename, *type;

DESCRIPTION
     "fopen" opens the file named by "filename" and associates a
     stream with it.  "fopen" returns a pointer to be used to iden-
     tify the stream in subsequent operations.

"type" is a character string having one of the following
     values:

"r"  open for reading
     "w"  create for writing

------------------------

NAME
     fread, fwrite - buffered binary input/output

SYNOPSIS
        #include <stdio.h> fread(ptr, sizeof(*ptr), nitems, stream)
        FILE *stream;

fwrite(ptr, sizeof(*ptr), nitems, stream)
        FILE *stream;

DESCRIPTION

"fread" reads, into a block beginning at "ptr", "nitems"
        of data of the type of "*ptr" from the named input "stream".
        It returns the number of items actually read.

"fwrite" appends at most "nitems" of data of the type "*ptr"
        to the named output "stream". It returns the number of items
        actually written.

------------------------

NAME
     malloc - main memory allocator
```

SYPNOSIS

```
char *malloc(size)
unsigned size;
```

DESCRIPTION

"malloc" provide a simple general purpose memory allocation package. "malloc" returns a pointer to a block of at least "size" bytes beginning on a word boundary.

---

NAME fabs - absolute value

SYPNOSIS

```
include <stdio.h> double fabs(x)
double x;
```

DESCRIPTION

"fabs" returns the absolute value of x.

We claim:

1. A method of controlling operation of an imaging device in response to a two-dimensional array of pixel values f(u,v) representing an image having an edge of amplitude C, comprising:
   (a) forming an enhanced array of pixel values g(u,v) from the values f(u,v),
   (b) forming a two-dimensional array of binary values h(u,v) by applying the enhanced array to a two-dimensional array of threshold values t(u,v), and
   (c) applying the two-dimensional array of binary values to the imaging device for controlling the operation thereof,
   wherein $g(u,v) = m_f + k[f(u,v) - m_f]$ where $m_f$ is the average value of f(u,v) over a predetermined number of pixels in the neighborhood of the pixel (u,v) and k is dependent on both the standard deviation in f(u,v) over a predetermined number of pixels in the neighborhood of the pixel (u,v) and a number which is inversely proportional to the distance between the point (u,v) and a point (x,y) such that t(x,y)−t(u,v) is less than C.

2. A method according to claim 1, wherein the standard deviation is approximated by the absolute moment of the value of f(u,v).

3. A method according to claim 1, wherein the two-dimensional array of threshold values samples edges of amplitude Ci at spatial frequencies $f_{Ci}$ and the value of k is larger for small values of $f_{Ci}$ than for larger values of $f_{Ci}$.

4. A method according to claim 1, wherein the two-dimensional array of threshold values is composed of a plurality of identical two-dimensional sub-arrays in non-overlapping relationship.

5. A method according to claim 4, wherein the two-dimensional sub-array is a square array.

6. A method according to claim 5, wherein the square array is a magic square.

7. Apparatus for processing a two-dimensional array of pixel values f(u,v) representing an image having an edge of amplitude C, comprising:
   means for forming an enhanced array of pixel values g(u,v) from the values f(u,v), and
   means for forming a two-dimensional array of binary values h(u,v) by applying the enhanced array g(u,v) to a two-dimensional array of threshold values t(u,v)
   wherein $g(u,v) = m_f + k[f(u,v) - m_f]$ where $m_f$ is the average value of f(u,v) over a predetermined number of pixels in the neighborhood of the pixel (u,v)

and k is dependent on both the standard deviation in f(u,v) over a predetermined number of pixels in the neighborhood of the pixel (u,v) and a number which is inversely proportional to the distance between the point (u,v) and a point (x,y) such that t(x,y)−t(u,v) is less than C.

8. Apparatus according to claim 7, further comprising a bi-level imaging device and means for applying the array of binary values to the bi-level imaging device to control the operation thereof.

* * * * *